US009730425B2

(12) United States Patent
Renforth et al.

(10) Patent No.: US 9,730,425 B2
(45) Date of Patent: Aug. 15, 2017

(54) TRANSPORT DEVICE HAVING LIQUID RESISTANCE APPARATUS

(71) Applicant: DOSKOCIL MANUFACTURING COMPANY, INC., Arlington, TX (US)

(72) Inventors: Jack W. Renforth, Azle, TX (US); Ann Hanson, Ionia, MI (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 103 days.

(21) Appl. No.: 14/578,610

(22) Filed: Dec. 22, 2014

(65) Prior Publication Data

US 2015/0101542 A1  Apr. 16, 2015

Related U.S. Application Data

(62) Division of application No. 13/910,716, filed on Jun. 5, 2013, now Pat. No. 8,944,009.

(60) Provisional application No. 61/790,651, filed on Mar. 15, 2013.

(51) Int. Cl.
| | |
|---|---|
| *A01K 1/035* | (2006.01) |
| *A01K 1/00* | (2006.01) |
| *A01K 1/02* | (2006.01) |
| *A01K 1/01* | (2006.01) |
| *A01K 1/015* | (2006.01) |

(52) U.S. Cl.
CPC .............. *A01K 1/0035* (2013.01); *A01K 1/01* (2013.01); *A01K 1/0157* (2013.01); *A01K 1/0245* (2013.01); *A01K 1/0254* (2013.01)

(58) Field of Classification Search
CPC .... A01K 1/0107; A01K 1/033; A01K 1/0353; A01K 1/0245; A01K 1/0254; A01K 1/035; A01K 1/0272; A01K 1/0236; A01K 1/034
USPC ....... 119/482, 496, 497, 498, 499, 500, 501, 119/28.5, 452, 453, 165, 169, 170
See application file for complete search history.

(56) References Cited

U.S. PATENT DOCUMENTS

| | | | | |
|---|---|---|---|---|
| 2,032,248 A | * | 2/1936 | Bins ..................... | A01K 1/0353 119/28.5 |
| 2,538,778 A | * | 1/1951 | Halpin ................. | A01K 1/0245 119/497 |
| 3,308,789 A | * | 3/1967 | Artig ..................... | A01K 1/033 119/482 |
| 3,850,144 A | * | 11/1974 | Springer ............... | A01K 1/029 119/497 |
| 4,930,170 A | * | 6/1990 | Kobayashi .......... | A47C 17/045 5/12.1 |
| 5,000,116 A | * | 3/1991 | Fife ..................... | A01K 1/0353 119/28.5 |

(Continued)

*Primary Examiner* — Trinh Nguyen (74) *Attorney, Agent, or Firm* — Global IP Counselors, LLP (57) ABSTRACT

A transport device structured to carry an animal includes a first component having a handle and a second component having a base and at least a first wall. The first component is structured to be located on the second component to form an enclosed region situated generally between the first and second components. The transport device also includes a cushion apparatus situated adjacent at least one of the base and the at least a first wall and a liquid resistance apparatus located on the second component and that is structured to resist penetration of a liquid from an interior region of the transport device to an exterior region of the transport device.

20 Claims, 6 Drawing Sheets

(56) References Cited

U.S. PATENT DOCUMENTS

| | | | | |
|---|---|---|---|---|
| 5,144,911 | A * | 9/1992 | Moore | A01K 1/0353 119/28.5 |
| 5,170,745 | A * | 12/1992 | Burdette, Jr. | A01K 1/0254 119/497 |
| 5,282,439 | A * | 2/1994 | Oaks | A01K 1/0353 119/28.5 |
| 5,653,195 | A * | 8/1997 | Young | A01K 1/0157 119/28.5 |
| 5,662,065 | A * | 9/1997 | Bandimere | A01K 1/0353 119/28.5 |
| 6,155,206 | A * | 12/2000 | Godshaw | A01K 1/0254 119/453 |
| 6,196,156 | B1 * | 3/2001 | Denesuk | A01K 1/0152 119/28.5 |
| 7,530,326 | B2 * | 5/2009 | Dunn | A01K 1/0353 119/169 |
| D616,158 | S | 5/2010 | Lu | |
| 2005/0132974 | A1 * | 6/2005 | Little | A01K 1/0218 119/498 |
| 2006/0021583 | A1 * | 2/2006 | Jakubowski | A01K 1/0353 119/28.5 |
| 2011/0239946 | A1 * | 10/2011 | Ogle | A01K 1/0353 119/28.5 |
| 2013/0047925 | A1 * | 2/2013 | Williams | A01K 1/0353 119/28.5 |
| 2013/0125827 | A1 * | 5/2013 | Pietra | F16M 13/02 119/496 |

* cited by examiner

TRANSPORT DEVICE HAVING LIQUID RESISTANCE APPARATUS

CROSS-REFERENCE TO RELATED APPLICATION

This application is a divisional of application Ser. No. 13/910,716, filed Jun. 5, 2013, and entitled "TRANSPORT DEVICE HAVING LIQUID RESISTANCE APPARATUS"; which claims priority from and claims the benefit of U.S. Provisional Patent application Ser. No. 61/790,651, filed Mar. 15, 2013.

BACKGROUND OF THE INVENTION

Field of the Invention

The disclosed concept pertains generally to transport devices, and more particularly to transport devices that resist penetration of a liquid from an interior region to an exterior region of the transport device.

Description of the Prior Art

Transport devices, particularly those that transport an animal, are well known. However, moisture from an interior region of known transport devices can appear at an exterior region of the transport devices, which is undesirable.

There is room for improvement in transport devices.

SUMMARY OF THE INVENTION

These needs and others are met by embodiments of the disclosed concept in which a liquid resistance apparatus is structured to resist penetration of a liquid from an interior region of an animal carrier to an exterior region thereof.

In accordance with one aspect of the disclosed concept, a transport device structured to carry an animal can be generally stated as including a first component comprising a handle, a second component comprising a base and at least a first wall, the first component being structured to be disposed on the second component to form an enclosed region situated generally between the first component and the second component. The transport device further comprises a cushion apparatus situated adjacent at least one of the base and the at least a first wall; and a liquid resistance apparatus disposed on the second component and being structured to resist penetration of a liquid from an interior region of the transport device to an exterior region of the transport device.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As will be discussed below, a transport device 2 in accordance with the disclosed and claimed concept can advantageously resist penetration of a liquid from an interior region 30 thereof to an exterior region 32 thereof by including a liquid resistance apparatus 28.

Figure 1:
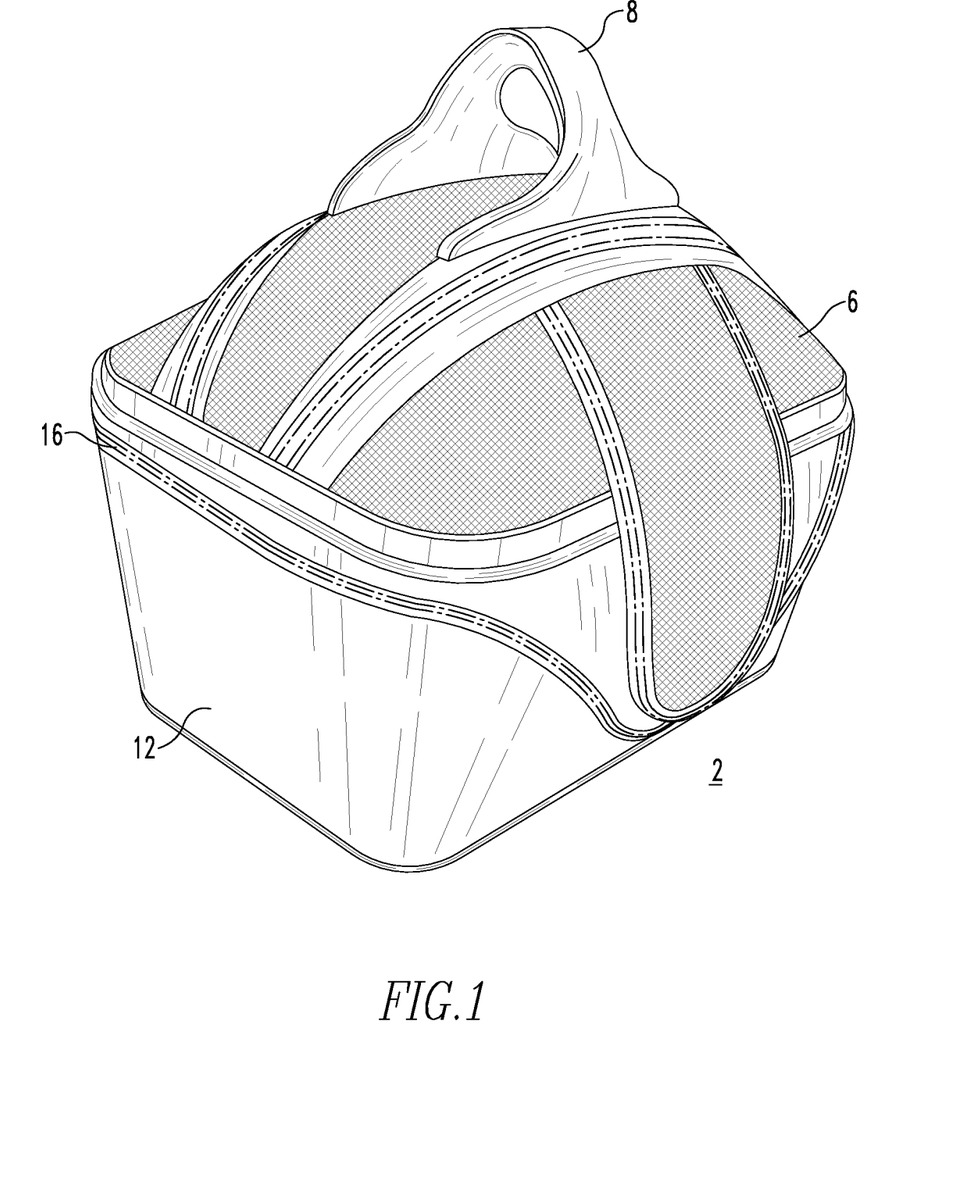
FIG. 1 is an isometric view of a transport device having a liquid resistance apparatus in accordance with the exemplary embodiment of the disclosed concept.

The disclosed concept is described in association with transport devices that are structured to carry animals. FIG. 1 shows the improved transport device 2, which is structured to carry an animal. The non-limiting embodiment shows a first component that is a mesh cap 6. The mesh cap 6 includes a handle 8 and is coupled to a second component that is an enclosure piece 12. The mesh cap 6 may include the handle 8, a strap (not shown), or any other suitable mechanism allowing the transport device 2 to be carried. The mesh cap 6 and enclosure piece 12 are structured to be coupled by a separable fastener 16 which may be, for example and without limitation, a zipper mechanism (schematically shown with double dashed lines in FIG. 1).

Figure 2:
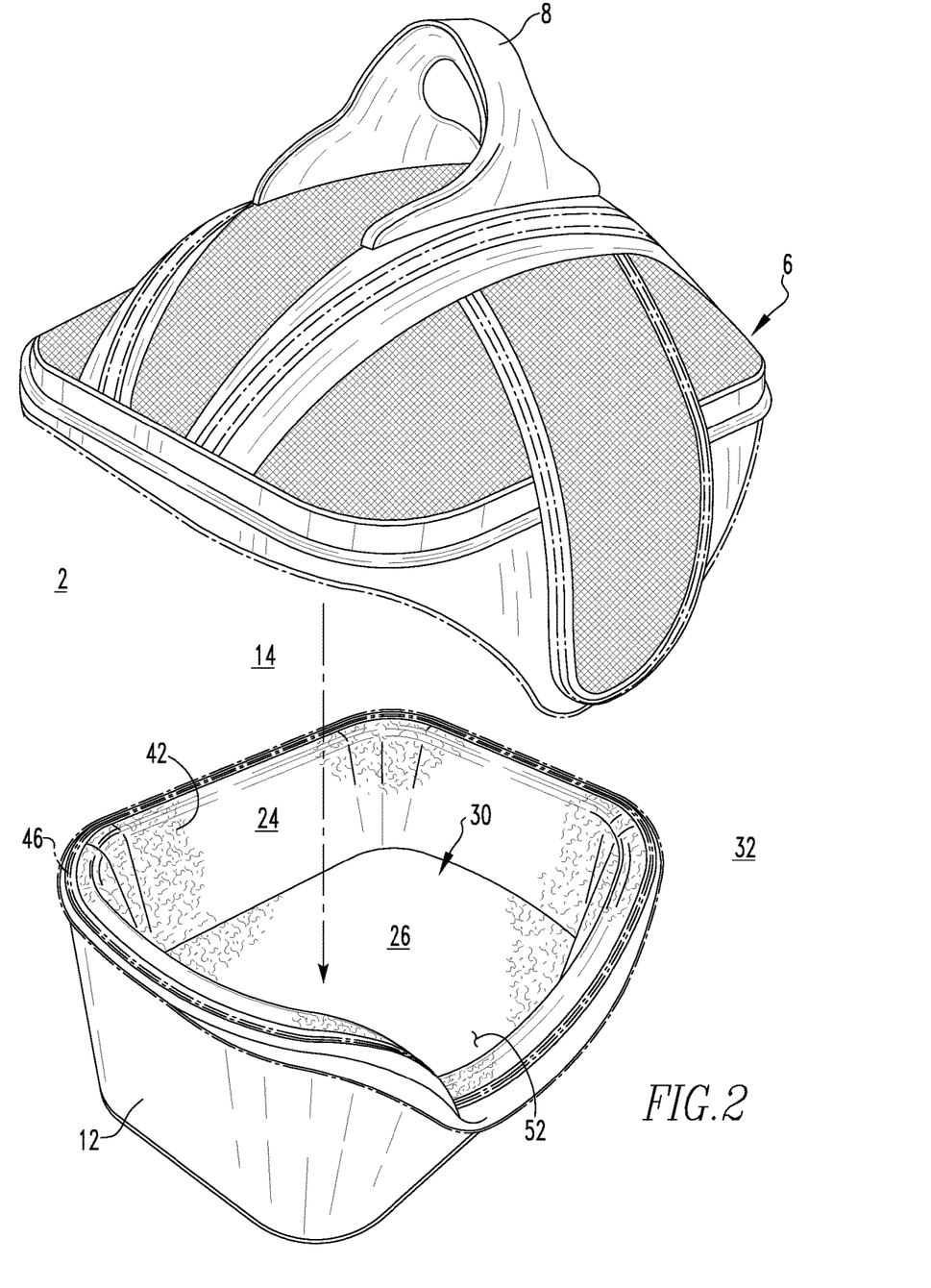
FIG. 2 is an exploded view of the transport device of FIG. 1.
Figure 3:
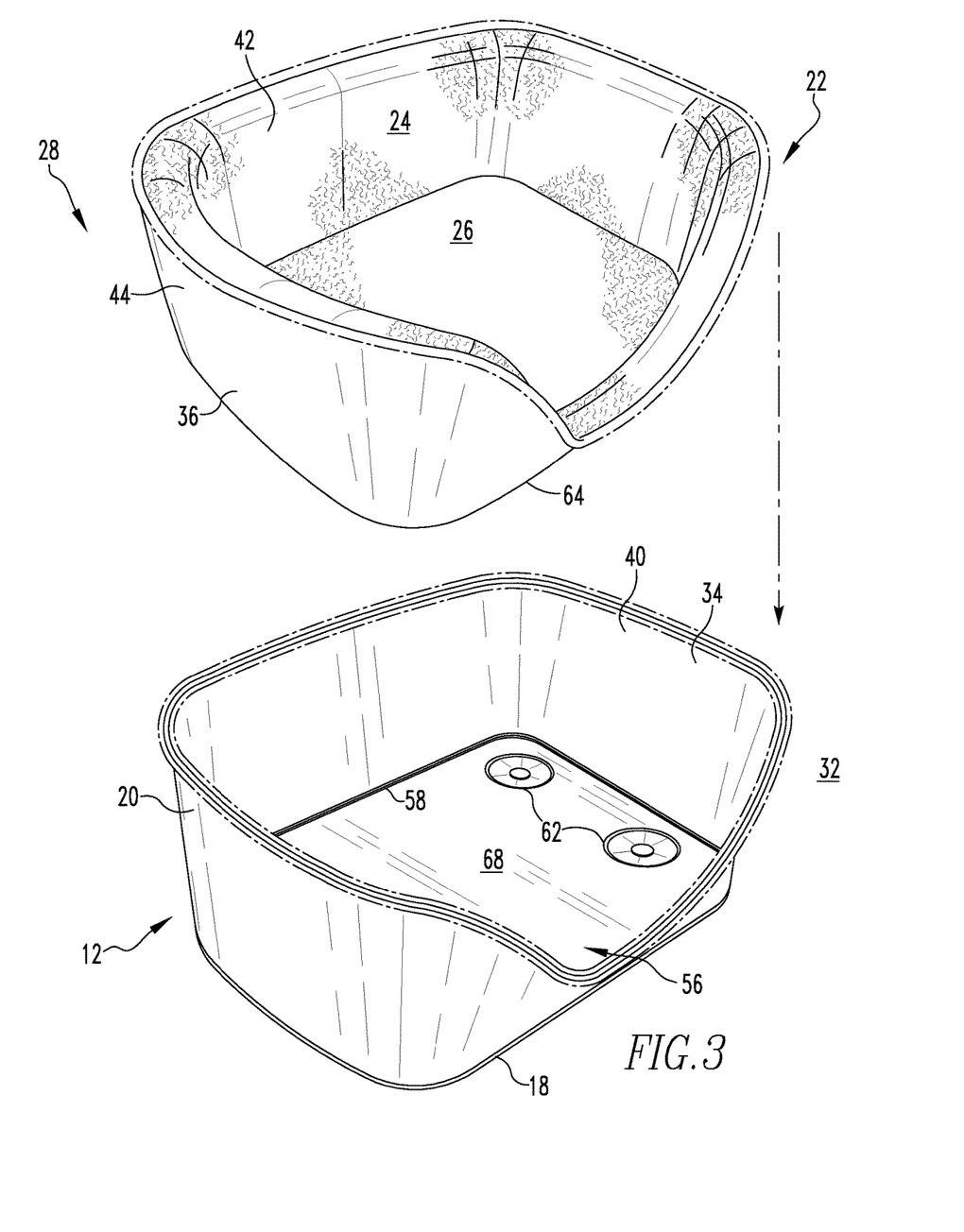
FIG. 3 is an exploded view of a cushion apparatus and enclosure piece of the transport device of FIG. 1.

Seen in FIG. 2, the mesh cap 6 is structured to be coupled to the enclosure piece 12 such that an enclosed region 14 is formed therebetween. FIG. 3 shows the enclosure piece 12 having a base 18 and at least a first wall 20, and also shows a cushion apparatus 22 for an animal to sit or lie on. The cushion apparatus 22 comprises a lateral pad 24 and a support pad 26 and is depicted herein as being situated adjacent both the base 18 and the at least a first wall 20. Additionally, the transport device 2 includes a liquid resistance apparatus 28 disposed on the enclosure piece 12 that is structured to resist the penetration of a liquid from an interior region 30, seen in FIG. 2, to an exterior region 32 of the transport device 2.

In accordance with one aspect of the disclosed concept, and as will be set forth in greater detail below, the liquid resistance apparatus 28 may include one or more liquid resistance laminae 34, 36, 38, each of which is structured to resist the penetration of a liquid such as, for example and without limitation, urine, from the interior region 30 to the exterior region 32 of the transport device 2. It is within the scope of the disclosed concept for the liquid resistance laminae 34, 36, 38 to be made of any material suitable to resist the penetration of a liquid. The liquid resistance laminae 34, 36, 38 may, for example and without limitation, be made of a cloth material and a polymer material coated on the cloth material. Known cloth materials have been coated with polymer materials, but only contain an amount of the polymer material sufficient to hold the cloth material together for cutting and sewing. As such, they do not resist penetration of a liquid to an exterior region 32.

The liquid resistance laminae 34, 36, 38 of the instant invention may be formed of a cloth material that has received multiple coats of a polymer material such that the liquid resistance laminae 34, 36, 38 resist the penetration of a liquid. It may also be enough for the liquid resistance laminae 34, 36, 38 to be formed from the cloth material that has received only a single coat of the polymer material, provided the single coat is otherwise of sufficient thickness to make the liquid resistance laminae 34, 36, 38 resistant to the penetration of a liquid. The cloth material may be, for example and without limitation, nylon or other appropriate material. The polymer material may be, for example and without limitation, PVC or polyurethane.

FIG. 3 illustrates a first liquid resistance lamina 34 and a second liquid resistance lamina 36. The first liquid resistance lamina 34 is situated adjacent a surface 40 of the at least a first wall 20 that faces the enclosed region 14. Referring to FIG. 3, the first liquid resistance lamina 34 may be affixed to the at least a first wall 20 with adhesives or otherwise. However, it is within the scope of the disclosed concept for the first liquid resistance lamina 34 to not be affixed to the at least a first wall 20.

The second liquid resistance lamina 36 is located on the lateral pad 24, which is structured to be located on the enclosure piece 12. The lateral pad 24 has a layer of padding material internal thereto, and further has a first surface 42 facing generally toward the enclosed region 14. Schematically shown in FIGS. 2-4, the first surface 42 of the lateral pad 24 is a surface of a cover element which may be made of lambskin. It will also be appreciated that the lateral pad 24 may be made of any material suitable to provide a comfortable surface for an animal to sit or lie on. The lateral pad 24 also has a second surface 44 opposite the first surface 42, and that is an external surface of the second liquid resistance lamina 36. Also, schematically shown with double dashed lines in FIG. 2, the lateral pad 24 is structured to be coupled to the enclosure piece 12 by a separable fastener 46 which may be, for example and without limitation, a zipper mechanism.

The first surface 42 of the lateral pad 24 generally faces toward the enclosed region 14, whereas the second surface 44, i.e., the second liquid resistance lamina 36 situated on the lateral pad 24, faces generally in an opposite direction which, in the depicted exemplary embodiment, is generally toward the at least a first wall 20 of the enclosure piece 12. Seen in FIG. 4, a bottom portion 48 of the second liquid resistance lamina 36 extends inboard of a lateral edge 64 and terminates at a hole 50 formed in the portion 48 of the second liquid resistance lamina 36. The purpose of this feature is discussed below, and it is noted that in other embodiments the second liquid resistance lamina 36 may not include the hole 50 and still be within the scope of the disclosed concept. The second liquid resistance lamina 36 is affixed to the lateral pad 24, however it is within the scope of the disclosed concept for the second liquid resistance lamina 36 to not be affixed to the lateral pad 24.

The liquid resistance apparatus also comprises a third liquid resistance lamina 38 in the form of a cover portion of the support pad 26. The support pad 26 has a cushion element 52 that faces generally toward the enclosed region 14, seen in FIG. 2. The cushion element 52 has a cover portion that may be made of any material suitable to provide a comfortable surface for an animal to sit or lie on. Schematically shown in FIGS. 2-6, and as a non-limiting example, the cover portion is made of lambskin. However, it is within the scope of the disclosed concept for the cover portion to be made of any material suitable for animal to sit or lie on.

Figure 5:
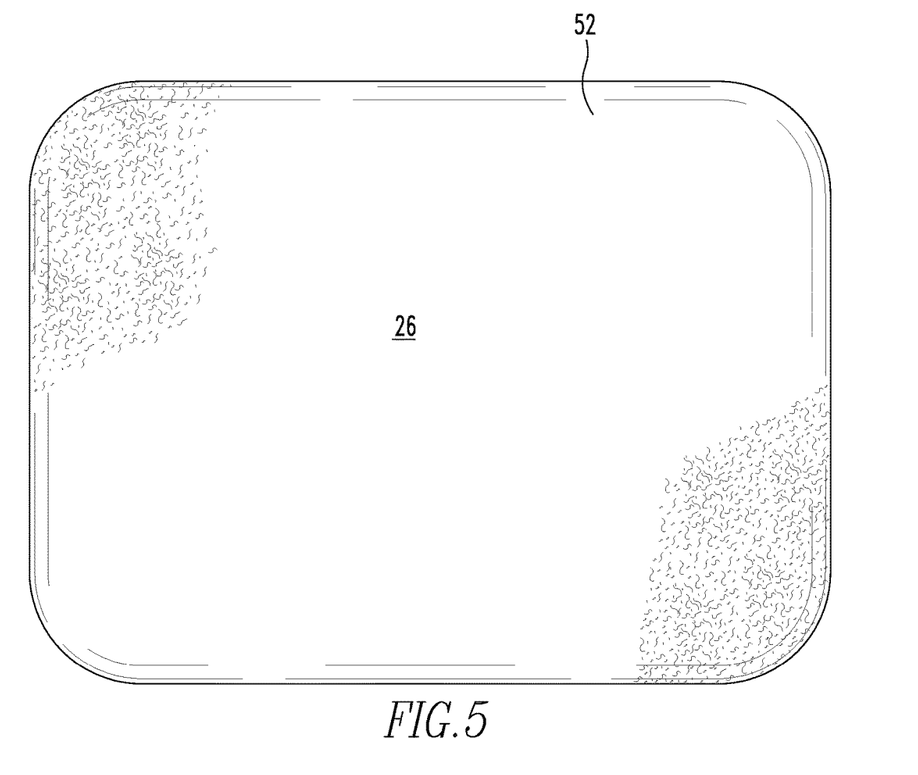
FIG. 5 is a top view of a support pad of the transport device of FIG. 1.
Figure 6:
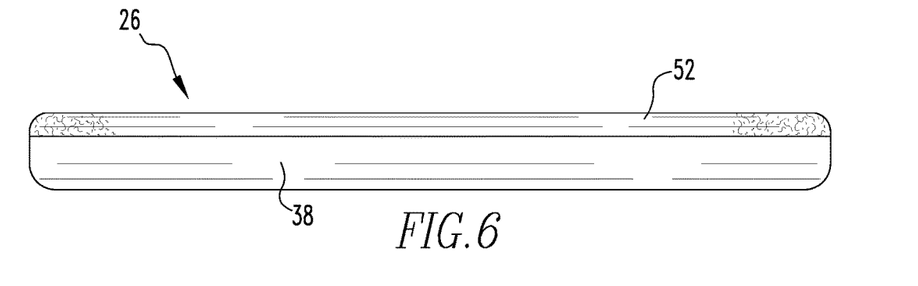
FIG. 6 is a side view of the support pad of FIG. 5.

The third liquid resistance lamina 38 faces generally away from the enclosed region 14. FIG. 5 illustrates a top view and FIG. 6 illustrates a side view of the support pad 26. The third liquid resistance lamina 38 may be affixed to the support pad 26. However, it is within the scope of the disclosed concept for the third liquid resistance lamina 38 to not be affixed to the support pad 26. The lateral pad 24 and the support pad 26 potentially may be used individually or in combination without departing from the present concept.

Figure 7:
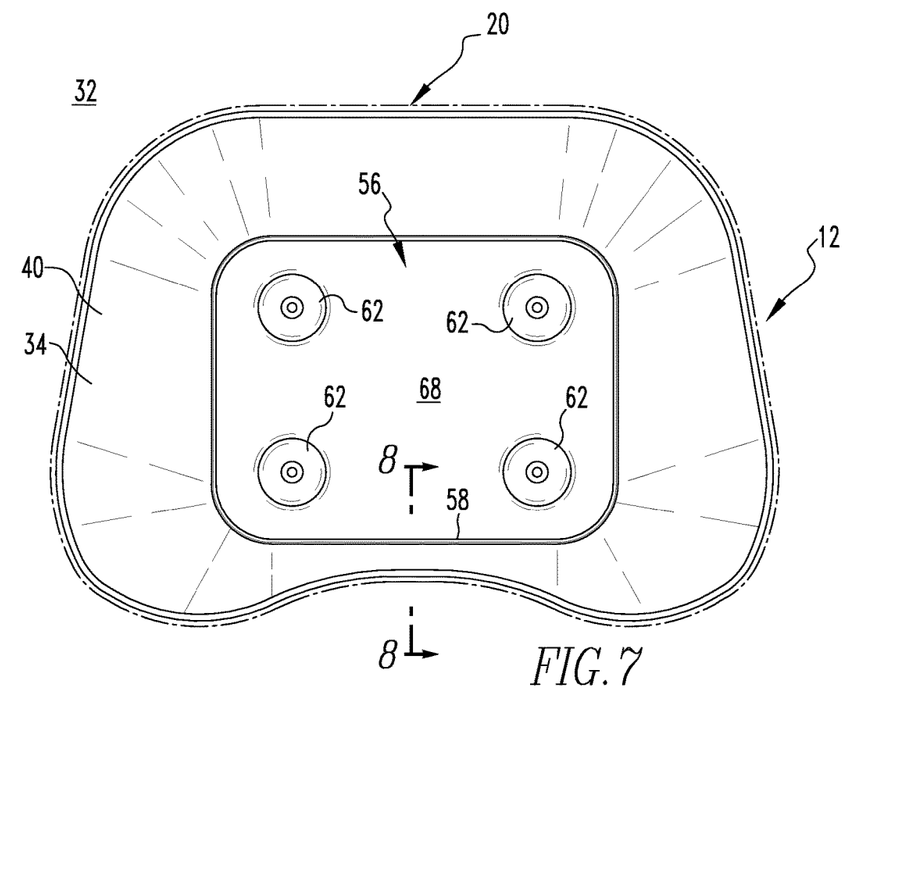
FIG. 7 is a top view of the enclosure piece of FIG. 3.
Figure 8:
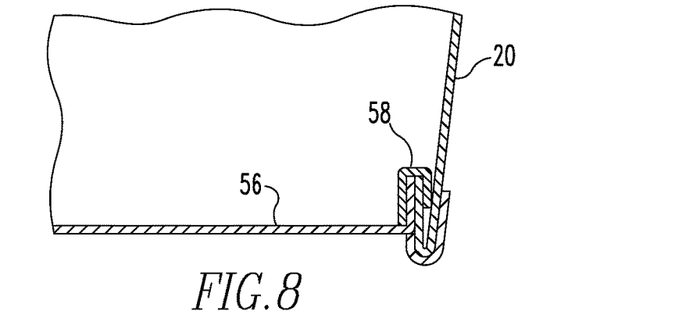
FIG. 8 is a section view taken along line 8-8 of FIG. 7 showing a raised rim and floor element.

In addition to the liquid resistance laminae 34, 36, 38, the base 18 of the transport device 2 comprises a floor element 56 and a raised rim 58 that is located on the floor element, which can be said to be a part of the liquid resistance apparatus 28. FIG. 8 is a section view of a portion of the enclosure piece 12 shown in FIG. 7, and shows the raised rim 58 located on the floor element 56. Together, the floor element 56 and raised rim 58 resist the penetration of a liquid to the exterior region 32 of the transport device 2. Additionally, the enclosure piece 12 may further comprise individual post elements 62 over which an animal's weight is distributed.

In accordance with an aspect of the disclosed concept, the liquid resistance apparatus 28 may employ the first liquid resistance lamina 34, the second liquid resistance lamina 36, the third liquid resistance lamina 38, and the raised rim 58 and floor element 56, together or in any combination.

Figure 4:
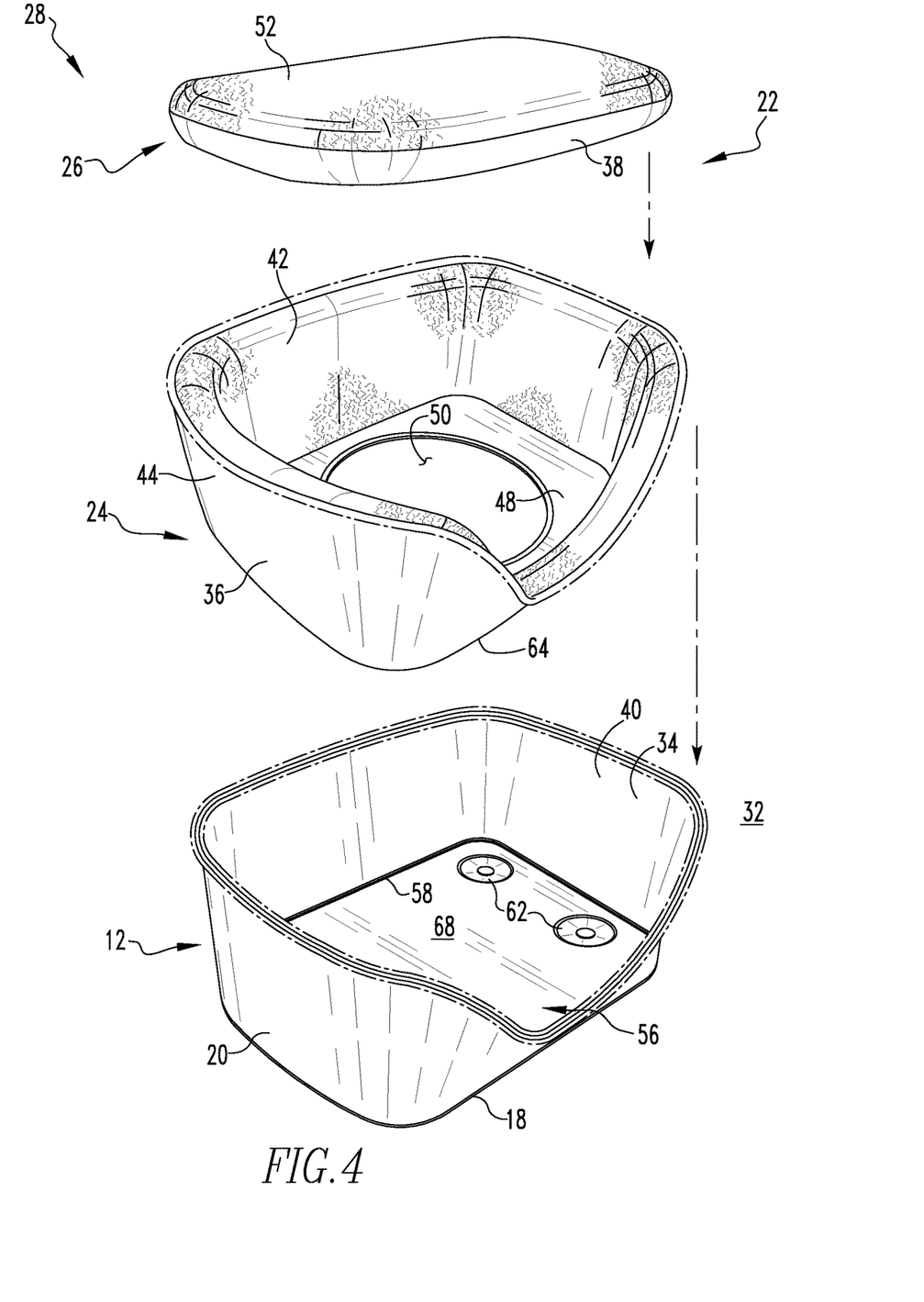
FIG. 4 is another exploded view of the cushion apparatus and enclosure piece of FIG. 3.

Seen in FIG. 4, the second liquid resistance lamina 36 includes the lateral edge 64 that is situated adjacent the base 18 when the transport device 2 is in an assembled state. When the hole 50 is used in combination with the raised rim 58 and floor element 56, then the hole 50 directs a liquid, such as, for example and without limitation, urine, onto a central region 68 of the floor element 56. When this happens, liquid will not penetrate to the exterior region 32 of the transport device 2, and rather will be retained generally in the central region 68 where it may evaporate, by way of example. Seen in FIG. 4, the hole 50 is generally circular, although it is within the scope of the disclosed concept for the hole to be other shapes (e.g., without limitation, rectangular).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A transport device structured to carry an animal, comprising:
    a first component comprising a handle, the first component having a mesh portion extending from the handle toward a bottom peripheral edge of the first component;
    a second component comprising a base and at least a first wall, the first component being structured to be disposed on the second component in a closed position to form an enclosed region situated generally between the first and second components, and the first wall having a lowered portion that enables ingress and egress from the enclosed region, the lowered portion having an edge that is flush with the peripheral edge of the first component in the closed position;
    a cushion apparatus situated adjacent at least one of the base and the at least a first wall; and
    a liquid resistance apparatus disposed on the second component and being structured to resist penetration of a liquid from an interior region of the transport device to an exterior region of the transport device.

2. The transport device of claim 1 wherein
    the cushion apparatus comprises a lateral pad structured to be disposed on the second component, and wherein the liquid resistance apparatus comprises a liquid resistance lamina situated adjacent the lateral pad.

3. The transport device of claim 2 wherein
    the lateral pad has a first surface facing generally toward the enclosed region and a second surface opposite the first surface, and wherein the liquid resistance lamina is situated adjacent the second surface.

4. The transport device of claim 3 wherein the liquid resistance lamina is affixed to the lateral pad.

5. The transport device of claim 3 wherein the cushion apparatus further comprises a support pad, and wherein the liquid resistance apparatus further comprises another liquid resistance lamina situated adjacent the support pad, wherein the support pad has a cushion element that faces generally toward the enclosed region, the second liquid resistance lamina facing generally away from the enclosed region.

6. The transport device of claim 5 wherein the base includes a floor element, and wherein the liquid resistance apparatus further comprises the floor element and a raised rim disposed on the floor element.

7. The transport device of claim 6 wherein the liquid resistance apparatus further comprises a further liquid resistance lamina situated adjacent the at least a first wall and facing generally toward the enclosed region.

8. The transport device of claim 1 wherein the base comprises a floor element, and wherein the liquid resistance apparatus comprises the floor element and a raised rim disposed on the floor element.

9. The transport device of claim 1 wherein the cushion apparatus comprises a support pad structured to be situated adjacent the base, and wherein the liquid resistance apparatus comprises an additional liquid resistance lamina situated adjacent the support pad.

10. The transport device of claim 9 wherein the support pad comprises a cushion element that faces generally toward the enclosed region, and wherein the additional liquid resistance lamina faces generally away from the enclosed region.

11. The transport device of claim 10 wherein the base comprises a floor element, and wherein the liquid resistance apparatus further comprises the floor element and a raised rim disposed on the floor element.

12. The transport device of claim 11 wherein the liquid resistance apparatus further comprises a further liquid resistance lamina situated adjacent the at least a first wall and that faces generally toward the enclosed region.

13. The transport device of claim 1 wherein the liquid resistance apparatus comprises a liquid resistance lamina situated adjacent the at least a first wall that faces generally toward the enclosed region.

14. The transport device of claim 13 wherein the cushion apparatus comprises a support pad, and wherein the liquid resistance apparatus further comprises another liquid resistance lamina situated adjacent the support pad, wherein the support pad has a cushion element that faces generally toward the enclosed region, and wherein the another liquid resistance lamina faces generally away from the enclosed region.

15. The transport device of claim 13 wherein the base comprises a floor element, and wherein the liquid resistance apparatus further comprises the floor element and a raised rim disposed on the floor element.

16. The transport device of claim 1 wherein the cushion apparatus comprises a lateral pad disposed on the second component;
wherein the liquid resistance apparatus comprises a first liquid resistance lamina and a second liquid resistance lamina; wherein the first liquid resistance lamina is removably disposed on the lateral pad; wherein the second liquid resistance lamina is affixed to the at least a first wall.

17. A transport device structured to carry an animal, comprising:
a first component comprising a handle, the first component having a mesh portion extending from the handle toward a bottom peripheral edge of the first component;
a second component comprising a base and a wall having an edge, the first component being structured to be disposed on the second component in a closed position to form an enclosed region situated generally between the first and second components, and the wall having a lowered portion that enables ingress and egress from the enclosed region, the lowered portion having an edge that is flush with the peripheral edge of the first component in the closed position;
a cushion apparatus situated adjacent at least one of the base and the wall, the cushion apparatus comprising a lateral pad and a support pad removably disposed on the lateral pad; and
a liquid resistance apparatus disposed on the second component and being structured to resist penetration of a liquid from an interior region of the transport device to an exterior region of the transport device.

18. The transport device of claim 17 wherein the lateral pad comprises a first cushion element, wherein the support pad comprises a second cushion element, and wherein each of the first cushion element and the second cushion element faces the enclosed region.

19. The transport device of claim 17 wherein the transport device further comprises a separable fastener, wherein the separable fastener couples the lateral pad to the wall, wherein the base comprises a floor element, and wherein the support pad is generally disposed between the separable fastener and the floor element.

20. The transport device of claim 17 wherein the support pad is disposed internal with respect to the lateral pad.

* * * * *